United States Patent
Tones et al.

(10) Patent No.: US 7,900,933 B2
(45) Date of Patent: *Mar. 8, 2011

(54) BEARING SEAL WITH FLEXIBLE LIP

(75) Inventors: Christopher Tones, Palmyra, NY (US); Peter N. Osgood, Westborough, MA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/273,741

(22) Filed: Nov. 19, 2008

(65) Prior Publication Data
US 2009/0102136 A1    Apr. 23, 2009

Related U.S. Application Data

(63) Continuation of application No. 11/151,021, filed on Jun. 13, 2005, now Pat. No. 7,467,796.

(51) Int. Cl.
*F16J 15/32* (2006.01)

(52) U.S. Cl. .......... 277/560; 277/353; 277/566; 384/485

(58) Field of Classification Search .................. 277/562, 277/566, 565, 549, 349, 353, 357, 351, 424; 384/485
See application file for complete search history.

(56) References Cited

U.S. PATENT DOCUMENTS

| | | |
|---|---|---|
| 2,868,574 A | 1/1959 | Rich, Jr. |
| 3,822,890 A | 7/1974 | Bourgeois |
| 3,921,992 A | 11/1975 | Bertin |
| 4,165,881 A | 8/1979 | Salter |
| 4,166,628 A | 9/1979 | Blaydon |
| 4,234,196 A | 11/1980 | Lida |
| 4,585,236 A | 4/1986 | Simmons et al. |
| 4,650,195 A | 3/1987 | Dreschmann et al. |
| 4,984,812 A | 1/1991 | Wada et al. |
| 5,348,313 A | 9/1994 | Pawlakowitsch |
| 5,556,112 A | 9/1996 | Brandt |
| 5,758,881 A | 6/1998 | Stanley |
| 6,435,516 B1 | 8/2002 | Scott |
| 6,520,506 B2 | 2/2003 | Reinhardt et al. |
| 7,467,796 B2 * | 12/2008 | Tones et al. ................. 277/353 |
| 2005/0073110 A1 | 4/2005 | Armour et al. |

FOREIGN PATENT DOCUMENTS

| | | |
|---|---|---|
| EP | 1136142 | 9/2001 |
| GB | 1575730 | 9/1980 |
| GB | 2076481 | 12/1981 |
| JP | 2001-205314 | 7/2001 |
| JP | 2001-208212 | 8/2001 |

* cited by examiner

*Primary Examiner* — Alison K Pickard
(74) *Attorney, Agent, or Firm* — Seyed Kaveh E. Rashidi-Yazd

(57) ABSTRACT

A seal is disclosed for use on the tapered section of a roll neck in a rolling mill. The seal comprises a flexible circular seal body having a central axis and at least one radially outwardly extending flange joined by a hinge to an angularly extending lip. The hinge has a reduced thickness as compared to the thicknesses of the flange and the lip, and the lip has converging first and second sides leading to an enlarged rim. The rim has first and second peripheral faces that converge to an outer edge contained in a reference plane parallel to the central axis of the seal body.

14 Claims, 2 Drawing Sheets

BEARING SEAL WITH FLEXIBLE LIP

CROSS REFERENCE TO RELATED APPLICATION

The application is a continuation of U.S. patent application Ser. No. 11/151,021 filed Jun. 13, 2005, which claims priority to U.S. Provisional Application 60/600,871, filed Aug. 12, 2004.

BACKGROUND OF THE INVENTION

1. Field of the Invention

This invention relates generally to flexible seals for bearing applications, and is concerned in particular with a flexible lip seal of the type employed in rolling mill oil film bearings.

2. Description of the Prior Art

One example of a prior art seal design is disclosed in U.S. Pat. No. 2,868,574, wherein a seal is surrounded by a stationary circular seal end plate having a radially inwardly extending rigid flange separating oppositely arranged shoulders. The flexible seal has radially outwardly extending flexible flanges which are in sliding contact with inclined surfaces on the shoulders of the seal end plate. The flange/shoulder surface interface on the inboard side serves to retain bearing lubricant in the bearing, and the flange/shoulder surface interface on the outboard side serves to exclude contaminants such as cooling water, mill scale, etc. from penetrating into the bearing.

This design exhibits problems such as leakage of the bearing lubricant, contaminant entering the bearing chamber and excessive wear of the seal components. These problems are due in large part to the seal flanges which are thick and heavy throughout their length. Therefore, the flanges are not as flexible as they should be and have a tendency to become distorted and fail to provide an effective seal.

In the seal design disclosed in U.S. Pat. No. 4,165,881, these problem were addressed by providing the seal flanges with peripheral relatively thin flexible lips. This design resulted in improved sealing performance, but leakage problems persisted when the seal was not properly aligned with respect to the seal end plate.

A need has continued to exist, therefore, for a seal that can operate effectively under all operating conditions, including those in which the seals are improperly aligned with respect to the seal end plates.

SUMMARY OF THE INVENTION

In accordance with the present invention, an improved seal has a circular seal body with a central axis and at least one radially outwardly extending flange joined by a hinge to an angularly extending sealing lip. The hinge has a reduced thickness as compared to the thicknesses of the flange and lip. The lip has converging sides leading to an enlarged rim, and the rim has angled peripheral faces that converge to an outer edge.

In its operating environment, the seal is mounted on the tapered section of a roll neck, with the outer edge of the sealing lip in sliding contact with an adjacent shoulder of a seal end plate. Flexure of the sealing lip at the hinge serves in concert with the increased mass and stiffness of the enlarged rim and the angular relationship of the peripheral faces to maintain line contact between the outer edge of the sealing lip and the shoulder of the seal end plate.

These and other features and advantages of the present invention will now be described in further detail with reference to the accompanying drawings, wherein:

DETAILED DESCRIPTION

Figure 1:
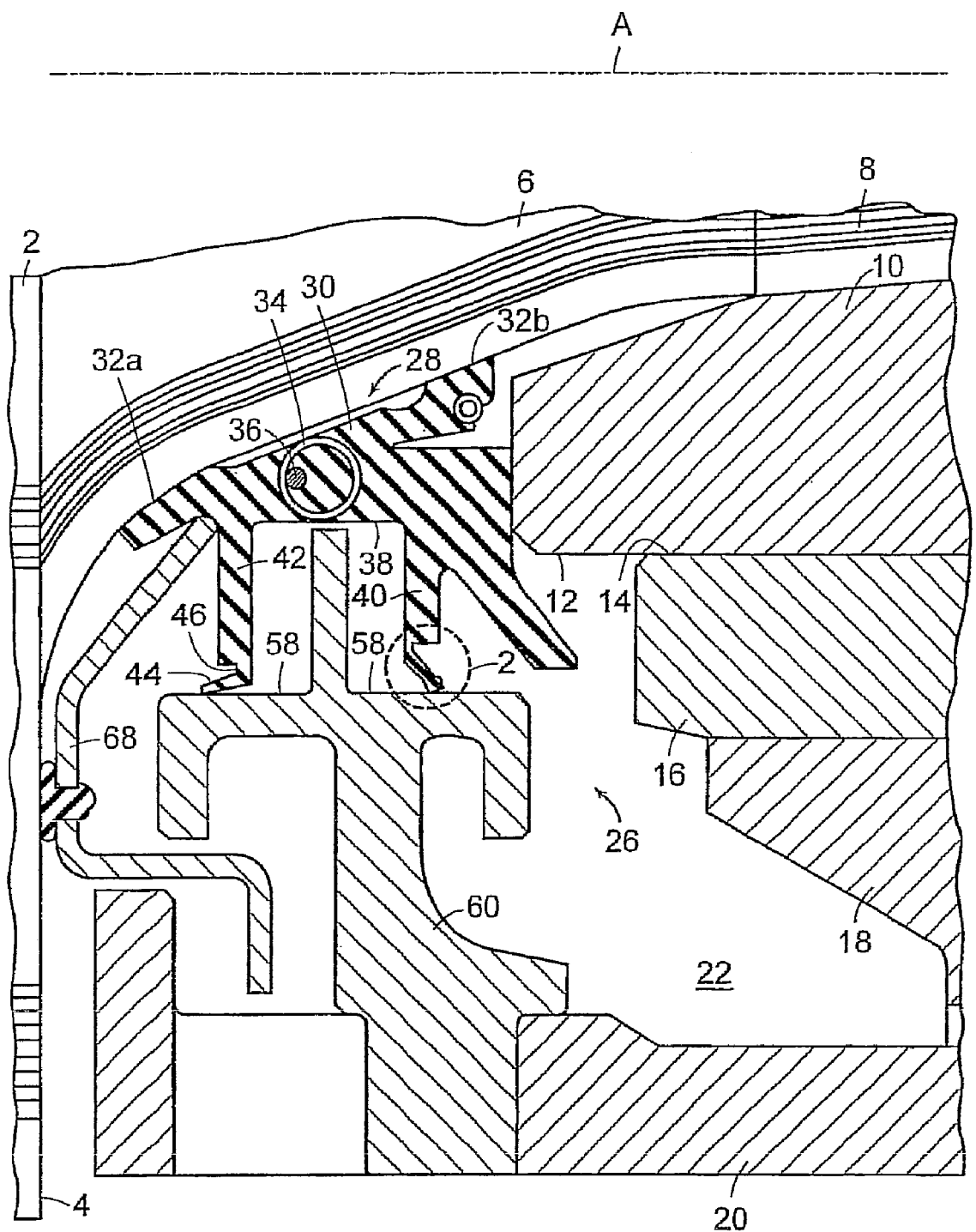
FIG. 1 is a cross-sectional view taken through the seal assembly of a rolling mill oil film bearing, and showing a flexible neck seal in accordance with the present invention.

Referring now to the drawings, and with initial reference to FIG. 1, there is shown at 2 a roll having an end face 4 and a roll neck with a tapered intermediate section 6 leading to a more gradually tapered end section 8. A sleeve 10 is mounted on the tapered end section 8 and is fixed relative to the roll neck by conventional means (not shown) for rotation therewith. The sleeve 10 has an outer bearing surface 12 which is journalled for rotation within an interior bearing surface 14 of a fixed bushing 16 which is carried in a roll chock 18.

The sleeve 10 rotates with the roll while the roll chock 18 and the fixed bushing 16 are stationary. Oil in flooding quantity is fed continuously between the bearing surfaces 12 and 14. A circular extension 20 of the roll chock provides at its bottom portion a sump 22 in which the oil emerging from the bearing is continuously collected. The oil is drawn away from the sump to be recycled back to the bearing surfaces.

Where the roll 2 is operating under "wet" conditions, coolant fluid is constantly flooding over the roll 2 and down over the end face 4. In spite of the centrifugal forces which tend to throw the coolant off of the roll, some of the coolant tends to work its way along the roll neck in the direction of the bearing. The objective of the seal assembly generally indicated at 26 and the flexible neck seal 28 which forms a part of the bearing assembly, is to prevent any of the coolant fluid from reaching and contaminating the bearing oil and, vice versa, preventing loss of oil from the bearing.

The flexible neck seal 28 includes a flexible circular seal body 30 having inner surfaces 32a, 32b adapted to be mounted in sealing engagement on the tapered section 6 of the roll neck. The neck seal 28 is molded of a suitable resilient rubber-like material. Optionally, the seal body 30 is internally reinforced by an embedded combination of a coiled spring 34 and a steel cable 36.

The seal body 30 has an exterior cylindrical surface 38 parallel to its central axis "A". Inboard and outboard circular flexible flanges 40, 42 extend radially from the seal body 30 at opposite ends of surface 38.

Figure 2:
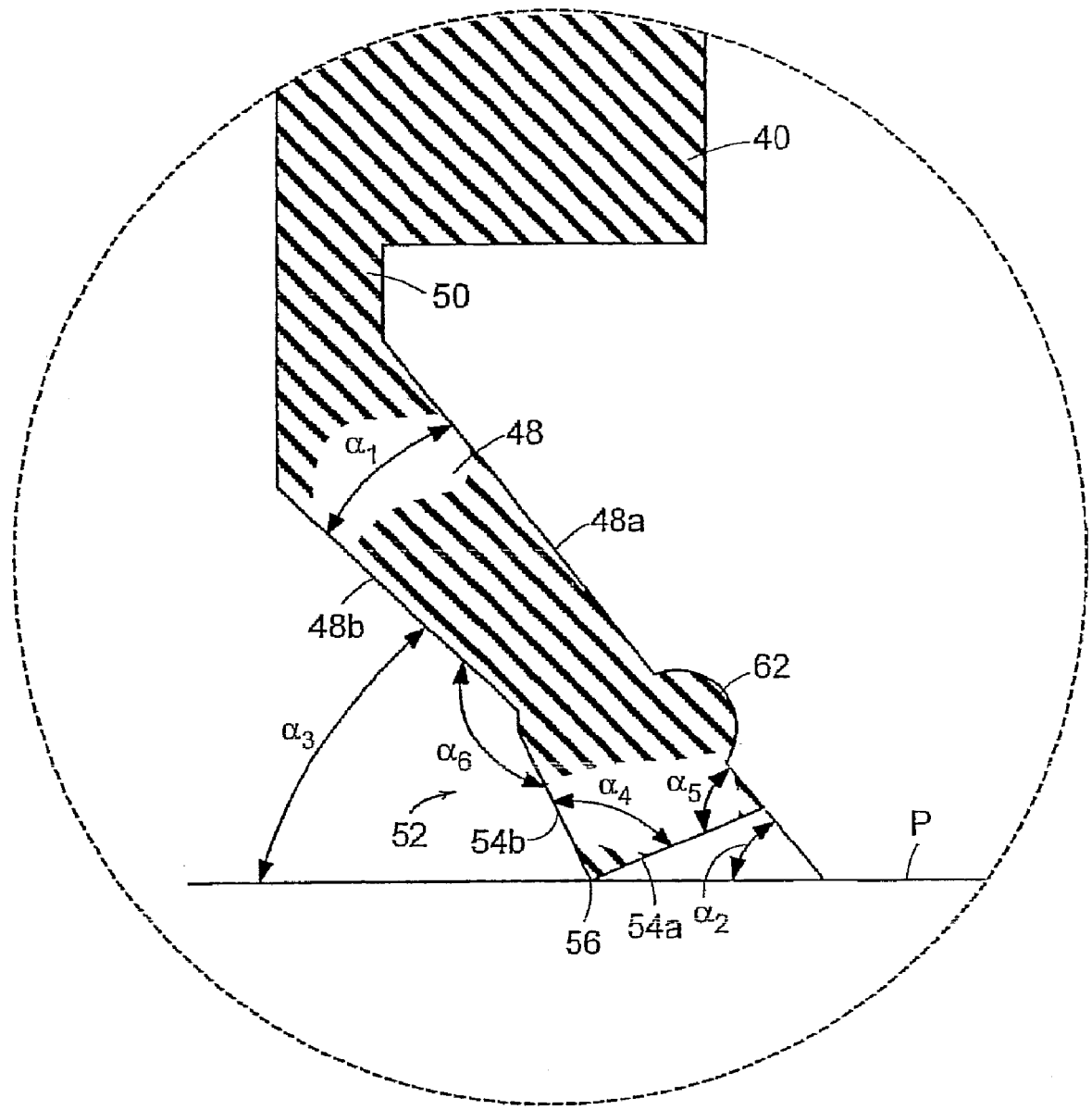
FIG. 2 is an enlarged cross-sectional view of the inboard flange on the neck seal depicted in FIG. 1.

The outboard flange 42 is provided with a conventional flexible lip 44 joined to the flange by a hinge 46 of reduced thickness. Referring additionally to FIG. 2, the inboard flange 40 also has a lip 48 joined to it by a hinge 50 of reduced thickness.

In accordance with the present invention, lip 48 has converging first and second sides 48a, 48b leading to an enlarged rim 52. The rim 52 has first and second peripheral faces 54a, 54b that converge to an outer edge 56. When the seal is in a relaxed unstressed state (not confined or otherwise distorted), the outer edge 56 is contained in a reference plane "P" parallel to the central axis "A".

When the seal is in its operating environment as depicted in FIG. 1, both lips 44 and 48 are in respective sliding contact with adjacent shoulders 58 of a seal end plate 60. The conventional lip 44 is only relatively lightly loaded against its respective shoulder 58, and the resulting area contact at the lip/shoulder interface is not conducive to maintaining a hydrodynamic condition. Seal misalignment further exacerbates this condition, causing accelerated wear and leakage.

In contrast, the outer edge 56 of lip 48 is in line contact with its respective shoulder 58. As the neck seal rotates with the roll neck, the extra mass of the enlarged rim 52 serves to centrifugally urge the outer edge 56 into sealing contact with the surrounding shoulder surface. The angled relationship of the peripheral faces 54a, 54b coupled with the increased stiffness of the enlarged rim 52 ensures hydrodynamic action on both sides of the outer edge 56 as the lip 48 flexes about the hinge 50 to compensate for seal misalignment.

In order to further enhance the aforesaid advantages, and as can best be seen in FIG. 2, the first and second sides 48a, 48b are arranged to define an included angle $\alpha_1$ of between about 4° to 10°, with the preferred angle being about 7°.

In the relaxed unstressed state, the first side 48a of the lip is arranged at an angle of $\alpha_2$ with respect to reference plane P of between about 46° to 54°, with an angle of about 50° being optimal. The second side 48b is arranged at an angle $\alpha_3$ with respect to the reference plane P of between about 39° to 47°, with an angle of 43° being optimal. The included angle $\alpha_4$ defined by peripheral faces 54a, 54b is preferably between about 90° to 106°, with 98° being optimal.

Advantageously, the first side 48a and the first peripheral face 54a define an included angle $\alpha_5$ of between about 66.5° to 77.5°, with 72° being optimal. The second side 48b and the second peripheral face 54b define an included angle $\alpha_6$ of between about 157.5° to 168.5°, with 163° being optimal.

The first side 48a is advantageously provided with a protuberance 62 spaced inwardly from the juncture of the first side 48a with the first peripheral face 54a. Protuberance 62 is preferably formed as a semi-circular rib.

The aforesaid angular relationships contribute to enhanced sealing performance of the hinged lip 48 as incorporated in a range of seal sizes. Line contact of the outer edge 56 with an adjacent fixed surface is maintained regardless of the degree of seal misalignment, thus optimizing retention of lubricant and exclusion of contaminants.

Although not shown, it will be understood that instead of being provided with a conventional lip 44, the outboard flange could also be provided with a lip 48 in accordance with the present invention.

We claim:

1. A seal for use on the tapered section of a roll neck in a rolling mill, said seal comprising:
    a flexible circular seal body having a central axis and at least one radially outwardly extending flange joined by a hinge to an angularly extending lip, said hinge having a reduced thickness as compared to the thicknesses of said flange and said lip, said lip having converging first and second sides leading to an enlarged rim and defining an included angle ($\alpha_1$) of between about 4° to 10°, said rim having first and second peripheral faces that converge to an outer edge contained in a reference plane parallel to said central axis, said first side and said first peripheral face defining an acute included angle ($\alpha_5$), and said second side and said second peripheral face defining an obtuse included angle ($\alpha_6$).

2. The seal as claimed in claim 1 wherein said included angle ($\alpha_1$) is about 7°.

3. The seal of claim 1 wherein said first and second peripheral faces define an included angle ($\alpha_4$) of between about 90° to 106°.

4. The seal as claimed in claim 3 wherein said angle ($\alpha_4$) is about 98°.

5. The seal as claimed in claim 1 further comprising a protuberance on the first side of said lip location spaced inwardly from the juncture of said first side and said peripheral first face.

6. The seal as claimed in claim 5 wherein said protuberance comprises a rib having a semi-circular cross section.

7. A seal for use on the tapered section of a roll neck in a rolling mill, said seal comprising:
    a flexible circular seal body having a central axis and at least one radially outwardly extending flange joined by a hinge to an angularly extending lip, said hinge having a reduced thickness as compared to the thicknesses of said flange and said lip, said lip having converging first and second sides leading to an enlarged rim, said rim having first and second peripheral faces that converge to an outer edge contained in a reference plane parallel to said central axis, said first side and said first peripheral face defining an acute included angle ($\alpha_5$), and said second side and said second peripheral face defining an obtuse included angle ($\alpha_6$), wherein when said flange and said lip are in an unstressed condition, the first side of said lip is arranged at an angle ($\alpha_2$) of between about 46° to 54° with respect to said reference plane.

8. The seal as claimed in claim 7 wherein said angle ($\alpha_2$) is about 50°.

9. A seal for use on the tapered section of a roll neck in a rolling mill, said seal comprising:
    a flexible circular seal body having a central axis and at least one radially outwardly extending flange joined by a hinge to an angularly extending lip, said hinge having a reduced thickness as compared to the thicknesses of said flange and said lip, said lip having converging first and second sides leading to an enlarged rim, said rim having first and second peripheral faces that converge to an outer edge contained in a reference plane parallel to said central axis, said first side and said first peripheral face defining an acute included angle ($\alpha_5$), and said second side and said second peripheral face defining an obtuse included angle ($\alpha_6$), wherein when said flange and said lip are in an unstressed condition, the second side of said lip is arranged at an angle ($\alpha_3$) of between about 39° to 47° with respect to said reference plane.

10. The seal as claimed in claim 9 wherein said angle ($\alpha_3$) is about 43°.

11. A seal for use on the tapered section of a roll neck in a rolling mill, said seal comprising:
    a flexible circular seal body having a central axis and at least one radially outwardly extending flange joined by a hinge to an angularly extending lip, said hinge having a reduced thickness as compared to the thicknesses of said flange and said lip, said lip having converging first and second sides leading to an enlarged rim, said rim having first and second peripheral faces that converge to an outer edge contained in a reference plane parallel to said central axis, said second side and said second peripheral face defining an obtuse included angle ($\alpha_6$) and said first side and said first peripheral face defining an acute angle ($\alpha_5$) of between about 66.5° to 77.5°.

12. The seal as claimed in claim 11 wherein said included angle ($\alpha_5$) is about 72°.

13. A seal for use on the tapered section of a roll neck in a rolling mill, said seal comprising:
a flexible circular seal body having a central axis and at least one radially outwardly extending flange joined by a hinge to an angularly extending lip, said hinge having a reduced thickness as compared to the thicknesses of said flange and said lip, said lip having converging first and second sides leading to an enlarged rim, said rim having first and second peripheral faces that converge to an outer edge contained in a reference plane parallel to said central axis, said first side and said first peripheral face defining an acute included angle ($\alpha_5$), and said second side and said second peripheral face defining an obtuse included angle ($\alpha_6$) of between about 157.5° to 168.5°.

14. The seal as claimed in claim 13 wherein said included angle ($\alpha_6$) is about 163°.

\* \* \* \* \*